(12) United States Patent
Watanabe et al.

(10) Patent No.: US 7,331,525 B2
(45) Date of Patent: Feb. 19, 2008

(54) CRADLE/POLYGON SCANNER

(75) Inventors: Hitoshi Watanabe, Saitamai (JP);
Hironobu Watanabe, Koshigaya (JP)

(73) Assignee: Optoelectronics Co., Ltd., Saitama Pref. (JP)

( * ) Notice: Subject to any disclaimer, the term of this patent is extended or adjusted under 35 U.S.C. 154(b) by 0 days.

(21) Appl. No.: 11/300,948

(22) Filed: Dec. 15, 2005

(65) Prior Publication Data

US 2007/0205289 A1    Sep. 6, 2007

(51) Int. Cl.
*G02B 26/12* (2006.01)

(52) U.S. Cl. .......................... 235/462.39; 235/472.01; 235/486; 235/383; 235/462.46

(58) Field of Classification Search ............... 235/454, 235/472.01–472.03, 462.38–462.4, 462.43, 235/462.45, 462.49, 486, 383
See application file for complete search history.

(56) References Cited

U.S. PATENT DOCUMENTS 4,563,626 A * 1/1986 Ohtake ....................... 320/103
5,132,523 A    7/1992 Bassett
5,214,270 A    5/1993 Rando
5,640,002 A * 6/1997 Ruppert et al. ........ 235/462.46
6,299,067 B1 * 10/2001 Schmidt et al. ........ 235/462.45

* cited by examiner

*Primary Examiner*—Michael G. Lee
*Assistant Examiner*—Pedro A Rojas
(74) *Attorney, Agent, or Firm*—Kaplan Gilman Gibson & Dernier LLP

(57) ABSTRACT

A dual mode cradle, base station having a re-charging mode and a transmitting mode for wireless communication with a remote device and recharging a handheld scanning device is provided. The dual mode cradle, base station includes a transmitting subunit for wirelessly transmitting data originating from the handheld scanning device to a remote device; a re-charging subsystem disposed to be coupled to an electric power source for charging a battery within the handheld scanning device; and a scanning subsystem. The scanning subsystem includes the handheld scanning device; a polygon mirror adapted to rotably reflect a light path originating from the handheld scanning device, the light path disperse into a pattern for scanning a symbol.

14 Claims, 3 Drawing Sheets

CRADLE/POLYGON SCANNER

BACKGROUND OF THE INVENTION

1. Field of the Invention

The present invention generally relates to scanners, more particularly, relates to a dual mode scanning system having a handheld scanner for movable scanning and a cradle for fixed position canning with the cradle additionally adapted for recharging the handheld and wirelessly communicating with a remote station.

2. Description of the Related Art

Scan systems used for scanning symbols having data identifying characteristics such as barcodes are known. Scanner may be divided into two categories, the fixed position scanner and the handheld scanner. Typically, a handheld scanner is known for mobility and ease in handling. The handheld scanner usually has a power source. The power source may be a rechargeable battery adapted for recharging.

Re-chargers are known. Typically a re-charger includes a transformer, wiring, and connectors.

A handheld scanner needs to communicate or transmit data therein with a computer such as a base station or a remote station. The communication can be achieved either via connected wire line means, or wireless means. Further, some wireless means can be bulky in that some significant space is required such that it may not be advantageous for a handheld to include the wireless means. By way of an example, for a suitable power transmission, the size of a transmitter or power source therefore can be too big for a handheld scanner. In other words, for miniaturization purposes the handheld scanner needs to be smaller and free from carrying bulky device such as batteries.

Dual use scan system using a hand-held scanner as a light source for scanning fixed position barcodes is also known. For example U.S. Pat. No. 5,214,270 to Rando describes a bar code scanning system which can be operated in two scanning categories: handheld and fixed. The system incorporates a second scanning element having a fixedly mounted mirror and a dithering mirror disposed in relation to a hand-held scanner which is removably positioned in a holder means.

U.S. Pat. No. 5,132,523 to Bassett describes a dual mode optical scanning system having a portable bar code scanner comprises a housing member having a pair of sloping supporting surfaces oriented at an angle to each other and a floor portion on which is mounted a reflecting mirror. One of the sloping supporting surfaces includes a transparent substrate. A portable hand-held optical scanner is positioned adjacent the other sloping supporting surface for projecting a plurality of scanning light beams in the form of a scan pattern at the reflecting mirror which reflects the scan pattern onto the transparent substrate over which a bar code label is passed enabling the scanning light beams to scan the bar code label. A magnet mounted adjacent the other sloping supporting surface is sensed by a sensor mounted in the hand-held scanner for generating control signals which are used in operating the scanner in different modes of operation depending on whether the scanner is mounted on the housing or when the scanner is used to freely scan a bar code label.

Modern technology has progressed such that wireless communication is ubiquitous and rechargeable power source is essential for a hand held device. Further, for a suitable transmission of data wirelessly, the wireless transmitter may not be suitable to be included within a handheld device due to limited dimensional and weight considerations. Therefore, it is desirous to have scanning system having a set of devices adapted for both fixed position and movable scanning, as well as wireless communication and recharging with at least two devices disposed for dual use.

SUMMARY OF THE INVENTION

The present invention generally provides a cradle for a hand held scanner with wireless connectivity, recharging functionality, and transmission of data received from the wireless device to a controller.

The present invention provides a handheld scanner that can be positioned in a recharger using the handheld scanner's light source for fixed position scanning.

The present invention provides a cradle recharger adapted to receive a handheld scanner data and communicating the same wirelessly with a computer.

The present invention provides a rotable polygon mirror operable with a cradle recharger and a handheld scanner for fixed position scanning.

The present invention provides a switch for switching to a fixed position polygon scanning mode.

The present invention provides a dual mode scanning system having a cradle for fixed position scanning and a wireless handheld scanner for movable scanning.

A dual mode cradle, base station having a re-charging mode and a transmitting mode for wireless communication with a remote device and recharging a handheld scanning device is provided. The dual mode cradle, base station includes a transmitting subunit for wirelessly transmitting data originating from the handheld scanning device to a remote device; a re-charging subsystem disposed to be coupled to an electric power source for charging a battery within the handheld scanning device; and a scanning subsystem. The scanning subsystem includes the handheld scanning device; a polygon mirror adapted to rotably reflect a light path originating from the handheld scanning device, the light path disperse into a pattern for scanning a symbol.

A dual mode scanning system is provided. The system includes: a handheld scanning device; a dual mode cradle, base station disposed to receive the handheld scanning device for both recharging and using the handheld scanning device for fixed position scanning. The dual mode cradle has a transmitting subunit for wirelessly transmitting data originating from the handheld scanning device to a remote device; a re-charging subsystem disposed to be coupled to an electric power source for charging a battery within the handheld scanning device; and a scanning subsystem. The scanning subsystem includes the handheld scanning device; and a polygon mirror adapted to rotably reflect a light path originating from the handheld scanning device, the light path disperse into a pattern for scanning a symbol. The polygon mirror is either positioned within the dual mode cradle, or outside the same.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are

DETAILED DESCRIPTION OF THE PREFERRED EMBODIMENTS

Figure 1:
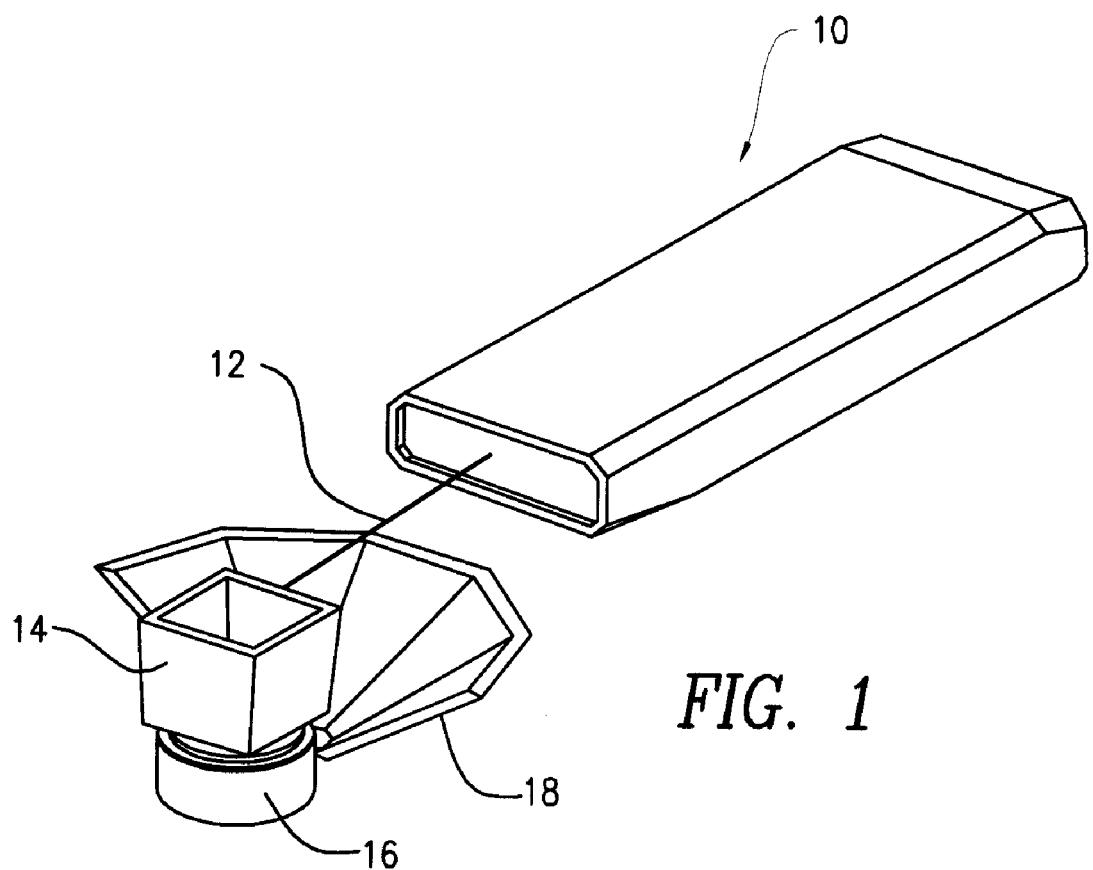
FIG. 1 depicts a perspective view of the present invention.
Figure 2:
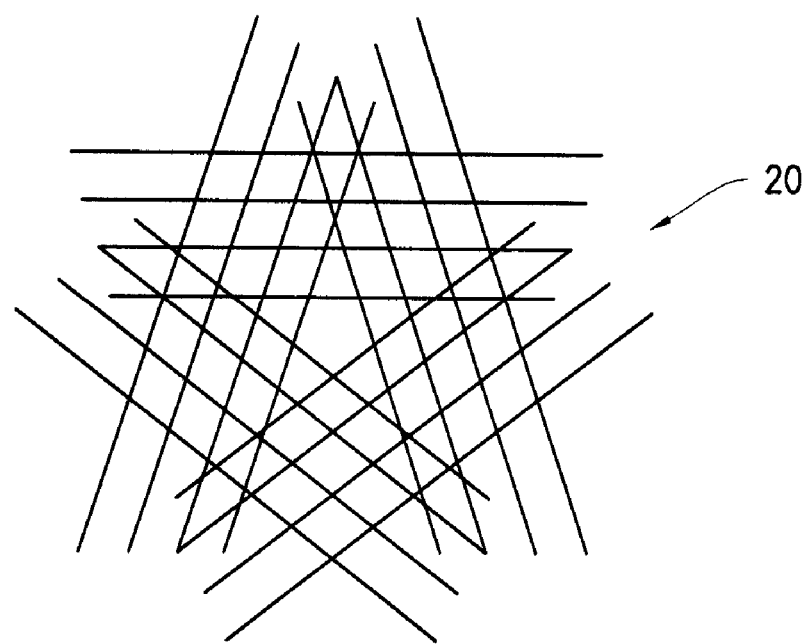
FIG. 2 depicts a scanning pattern of FIG. 1.
Figure 3:
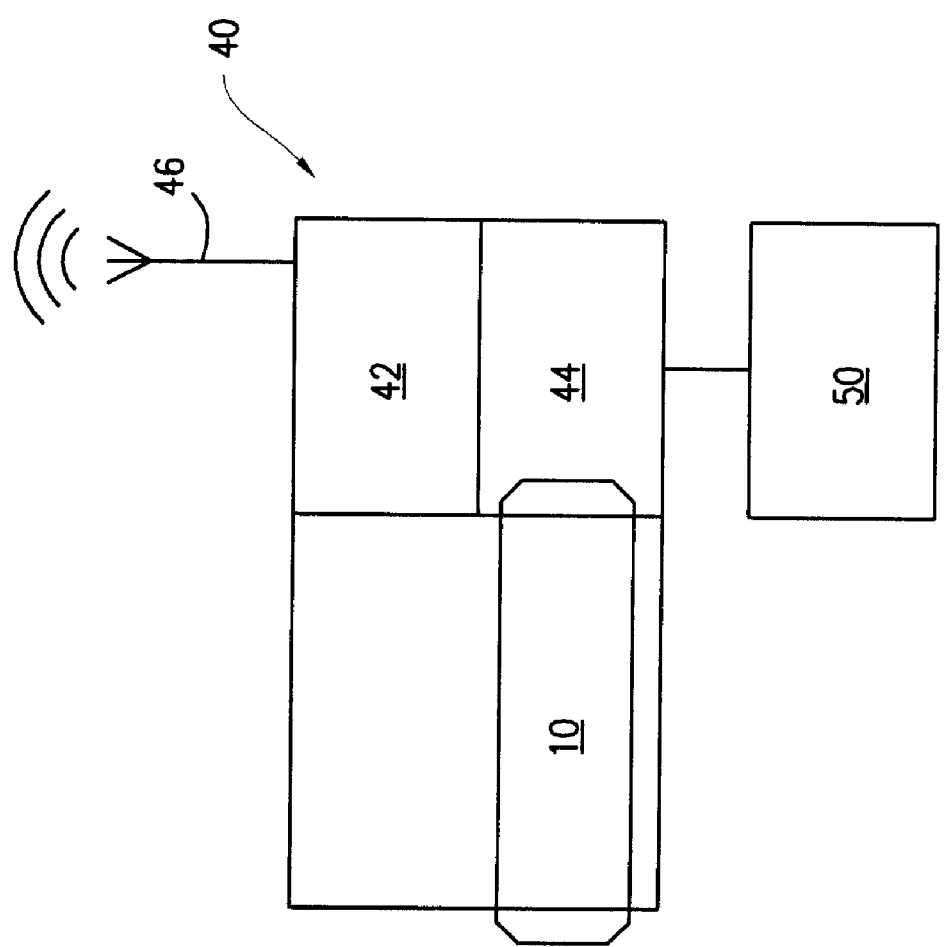
FIG. 3 depicts a first block diagram of the present invention having a handheld device in a re-charging position.

The present invention relates to using a scan system for both fixed position scanning and mobile scanning, as well as multiple usages for at least two devices within the system for charging a scanner and wireless communications, etc.

Referring now to FIGS. 1-4, a scanning system having a hand held scanner 10 is shown. Hand held scanner 10 is used for movable scanning in a known manner. Hand held scanner 10 includes a rechargeable battery (not shown). Hand held scanner 10 has a light source (also not shown) such as a laser for generating a beam such as a laser beam 12 for scanning. In the present invention, a novel usage of hand held scanner 10 is provided in that laser beam 12 is reflected by a rotable polygon mirror 14 driven by a driving motor 16 for fixed position scanning. Laser beam 12 is further rotationally reflected by a multi-angled mirror 18 and forms a pattern 20 for suitable scanning of symbols having data identifying characteristics. As can be seen, the movable hand held scanner 10 is kept stationary for scanning purposes.

As can be seen, hand held scanner 10 is required to be fixedly positioned on a member or device. As mentioned supra, the present invention teaches multiple usages of at least two devices. One of the multiple usages is using 12 for both fixed and mobile scanning. For mobile scanning, hand held scanner 10 is used in a known manner in that an operator hold hand held scanner 10 to movably scan a symbol such as a bar code with the operator adjusting an angle for scanning. For fixed position scanning, additional devices are required. The required devices include polygon mirror 14, driving motor 16, multi-angled mirror 18, and a cradle or base unit 40.

Cradle, base unit 40 includes a transmitting subsystem 42 and recharging subsystem 44. Transmitting subsystem 42 has an antenna 46 for wireless communication purposes. The re-charging subsystem 44 is coupled to a power source 50 and is disposed to recharge hand held scanner 10 at a recharge slot or position (see FIG. 3). In other words, a recharging slot is coupled to recharging subsystem 44 for recharging the batteries within hand held scanner 10.

Figure 4:
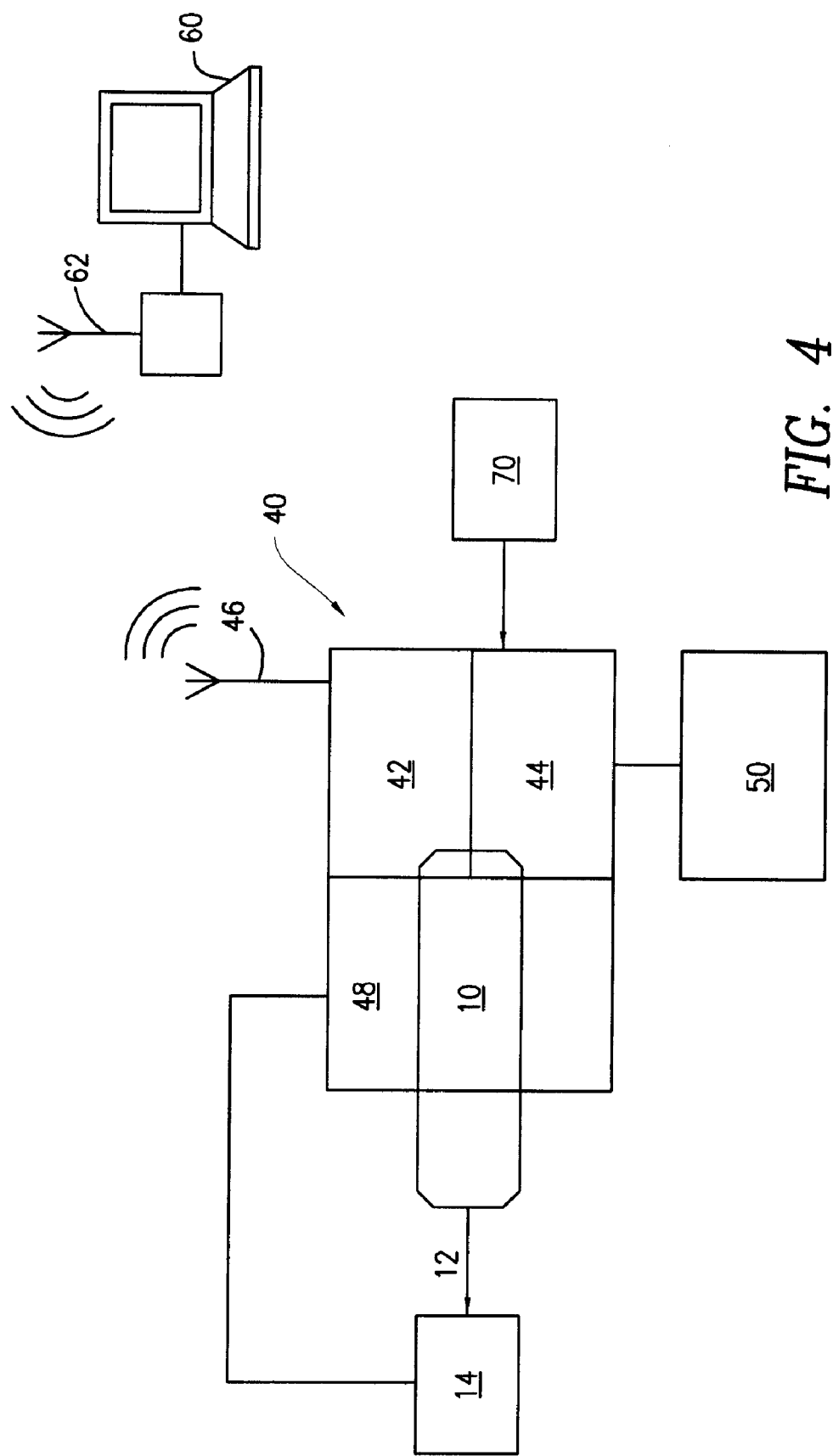
FIG. 4 depicts a second block diagram of the present invention having the handheld device of FIG. 3 in a fixed position scanning mode.

Referring specifically to FIG. 4, the fixed position scanning layout of the present invention is shown. Cradle, base unit 40 is disposed to receive hand held scanner 10 and having the laser beam 12 of hand held scanner 10 aimed at rotable polygon mirror 14. The reflected light is further processed either by hand held scanner 10, or an opto-electric subsystem 48 of cradle, base unit 40. In the preferred embodiment, opto-electric subsystem 48 is not needed in that the opto-electric system of hand held scanner 10 is dually used for both fixed position scanning and handhold mobile scanning.

The two slots i.e. the recharge slot and scanning slot on cradle, base unit 40 may be combined into a single slot. In other words, the two positions resting scanner 10 onto cradle 40 can be identical with a switch (not shown) internal to cradle, base unit 40 for switching between the scanning mode and the recharging mode. That is to say, the scanning slot and the recharging slot are physically one and the same, and a switch is used for switching between the two modes.

In an alternate embodiment, cradle, base unit 40 may include opto-electric subsystem 48 for signal processing of optic and electronics signals. Hand held scanner 10 typically has an optoelectronic processing subsystem substantially similar to opto-electric subsystem 48. Therefore, for multiple usage purposes, opto-electric subsystem 48 may be omitted and similar systems within scanner 10 is used for similar purposes.

The switch for switching between modes may be controlled by a controller 70, which may either be built-in within cradle 40, or outside the same. The controlling mechanism of micro-controller 70 may be mechanical or electrical. Further, micro-controller 70 may either be passive or active. In other words, an operator (not shown) may intentionally control the switching of the switch independent of placing the scanner 10 onto cradle 40—active. Alternatively, by placing the scanner 10 onto cradle 40, the switch may be actuated by such means as a mechanical or electric switch disposed to receive a weight from the scanner 10 thereby actuating the switch.

In an alternate embodiment, hand held scanner 10 is not fixedly positioned but subject to a dithering action such that a pattern similar to pattern 20 may be achieved for scanning symbols having data identifying characteristics such as a barcode. Therefore, the rotable polygon mirror 14 may not be needed.

It is noted that in building a compact version of the present invention, polygon mirror 14, driving motor 16, and multi-angled mirror 18 may not be included in cradle, base unit 40. However, if required, polygon mirror 14, driving motor 16, and multi-angled mirror 18 may be included in cradle, base unit 40.

A remote device 60 is provided for communicating with transmitting subunit transmitting subsystem 42 via 46. Typically, remote device 60 receives scanned data scanned by hand held scanner 10 and in turn received and transmitted by transmitting subunit 42 of cradle, base unit 40. However, remote device 60 may include an antenna 62 for both receiving and transmitting a data. Similarly, antenna 46 may both received and transmit data. In other words, transmitting subunit 42 can be a transceiver.

Hand held scanner 10 may be coupled to cradle, base unit 40 in various ways. By way of an example, base unit 40 may have at least two slots for receiving hand held scanner 10. A first slot may be used for recharging only (see FIG. 3) and a second slot for fixed position scanning. Alternatively, cradle, base unit 40 may only have a single slot specifically for receiving hand held scanner 10. A switch disposed within the wiring of cradle, base unit 40 adapted for switching between the charging mode and the fixed position scanning mode may be provided.

The operation of the present invention for scanning a barcode is as follows. Light originating from hand held scanner 10 with the laser beam 12 is first reflected off of polygon mirror 14 coupled to driving motor 16. The polygon mirror 14 will guide the laser light to multi-angled mirror 18, which causes the laser light to change its course again. As time elapses, the course of the light continuously changes. This continuous course change is what allows the laser light to eventually move across the entire barcode without moving the barcode itself. Pattern 20 allows for various positioning of a barcode. It is at this point that the light strikes the barcode, and reflects off of it. When the laser reflects off the barcode, the light is dispersed, and not focused as the laser light was. Most of the dispersed light then returns along the same path that the laser light traversed, until it reaches a photodetector (not shown) that may be within hand held scanner 10 or cradle, base unit 40. The photodetector receives the dispersed light, and sends a digital signal to the readout circuitry within hand held scanner 10 or cradle, base unit 40. The strength of the signal is based on the intensity of the light received. The readout circuitry then processes this signal. After the laser has reflected off each line of the barcode, and the resultant signal processed by the readout circuitry, the barcode has been scanned.

While the foregoing is directed to embodiments of the present invention, other and further embodiments of the invention may be devised without departing from the basic scope thereof, and the scope thereof is determined by the claims that follow.

What is claimed is:

1. A dual mode cradle, base station for a handheld scanning device, having a re-charging mode and a transmitting mode for wireless communication with a remote device and recharging the handheld scanning device, said dual mode cradle, base station comprising:
   a transmitting subunit for wirelessly transmitting data originating from said handheld scanning device to a remote device;
   a re-charging subsystem disposed to be coupled to an electric power source for charging a battery within said handheld scanning device; and
   a scanning subsystem comprising:
   a mechanical and electrical connection for said handheld scanning device; and
   a rotatable polygon mirror positioned and constructed to reflect a light originating from said handheld scanning device when received in said connection, so that said light is dispersed into a pattern for scanning a symbol, the polygon mirror being selectively actuable to operate in conjunction with said handheld device when received in said connection.

2. The dual mode cradle, base station of claim 1, further comprising a switch for switching between said re-charging mode and said transmitting mode; whereby said handheld device is positioned at a single operable position for both said re-charging mode and said transmitting mode.

3. The dual mode cradle, base station of claim 1, wherein the reflected light of said polygon mirror is directed to and reflected from said symbol and is further processed by said handheld scanning device.

4. The dual mode cradle, base station of claim 1, wherein said light comprises laser light.

5. The dual mode cradle, base station of claim 1, wherein said symbol comprises barcode.

6. A dual mode scanning system comprising:
   a handheld scanning device;
   a dual mode cradle, base station disposed to receive said handheld scanning device for both recharging and using said handheld scanning device for fixed position scanning, said dual mode cradle, comprising:
   a transmitting subunit for wirelessly transmitting data originating from said handheld scanning device to a remote device;
   a re-charging subsystem disposed to be coupled to an electric power source for charging a battery within said handheld scanning device; and
   a scanning subsystem comprising:
   said handheld scanning device being mounted in the cradle; and
   a polygon mirror mounted rotatably within the cradle and positioned so as to reflect a light path originating from said handheld scanning device, said light path being dispersed into a pattern for scanning a symbol;
   said polygon mirror being selectively actuable to reflect said light path.

7. The system of claim 6, further comprising a switch for switching between said re-charging mode and said transmitting mode; whereby said handheld device is positioned at a single operable position for both said re-charging mode and said transmitting mode.

8. The system of claim 6, wherein the reflected light of said light path from said symbol is further processed by said handheld scanning device.

9. The system of claim 6, wherein said light path comprises laser light path.

10. The system of claim 6, wherein said symbol comprises barcode.

11. A base station for holding a handheld scanner, said base station including an omnidirectional scanning mirror, wherein the scanning comprises a rotatable polygon mirror positioned in a light path from said handheld scanner, charging means, a mechanical interface for holding said hand held scanner, and control means for selectively operating the base station as scanner using either the omnidirectional scanning mirror in combination with the hand held scanner or the hand held scanner alone, or as a charging station for the hand held scanner.

12. The base station of claim 11 farther comprising a subsystem enabling the base station to communicate with a remote device.

13. The base station of claim 11 further comprising a multi-angle mirror in said light path cooperating with said polygon mirror to provide a two-dimensional scan pattern of light.

14. The base station of claim 11 wherein the scanning mirror comprises a multi-angle mirror positioned in a light path from said handheld scanner.

* * * * *